Figure 1:
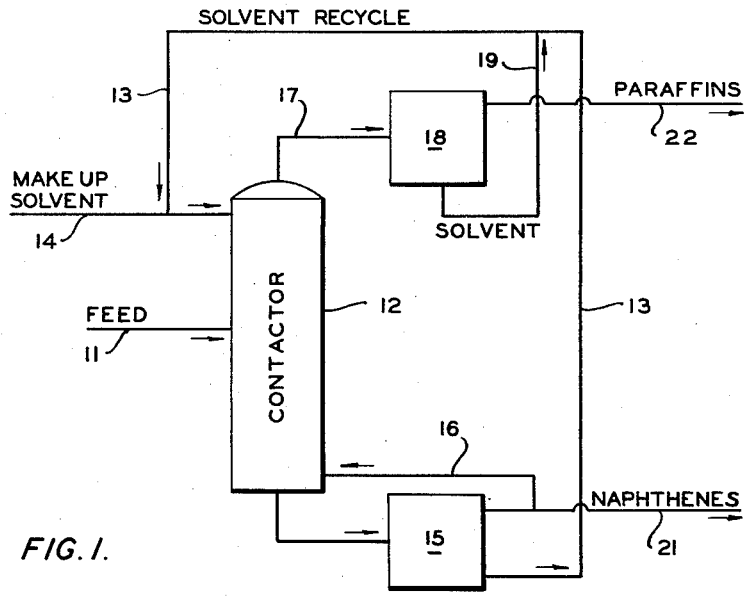

Nov. 20, 1956  J. A. WEEDMAN  2,771,494
SELECTIVE SOLVENT EXTRACTION OF NAPHTHENE
HYDROCARBONS EMPLOYING 2-PYRROLIDONE
Filed March 12, 1953

INVENTOR.
J. A. WEEDMAN
BY Hudson and Young
ATTORNEYS

United States Patent Office 2,771,494
Patented Nov. 20, 1956

2,771,494

SELECTIVE SOLVENT EXTRACTION OF NAPHTHENE HYDROCARBONS EMPLOYING 2-PYRROLIDONE

John A. Weedman, Bartlesville, Okla., assignor to Phillips Petroleum Company, a corporation of Delaware Application March 12, 1953, Serial No. 341,943

12 Claims. (Cl. 260—666)

This invention relates to a method for the separation and recovery of naphthene hydrocarbons from a mixture of hydrocarbons containing naphthenes. In a more specific aspect this invention relates to the removal and recovery of naphthene hydrocarbons from paraffinic hydrocarbons using a selective solvent. In another specific aspect this invention relates to the use of 2-pyrrolidone as a selective solvent for the separation of naphthene hydrocarbons from mixtures of naphthene and paraffin hydrocarbons.

The use of selective solvents for the separation of organic compounds is well known in the arts. Depending upon the characteristics of the extractive solvent and the organic compounds to be separated, the processes of solvent extraction or extractive distillation can be employed. These processes are useful for obtaining separation of mixtures the components of which have vapor pressures such as to make their separation by conventional fractional distillation difficult if not impossible, or to separate compounds which form azeotropes with each other. This invention is directed particularly to the separation of hydrocarbon mixtures which are difficult to separate by conventional means by employing 2-pyrrolidone for the solvent extraction or the extractive distillation of these fractions.

Solvent extraction operations are defined as those in which the separation of mixtures of different substances is accomplished by treatment in the liquid phase with a selective liquid solvent. In order for a separation to be effected, one or more of the components of the mixture must be more miscible with the solvent than the other components.

If two components are to be separated into substantially pure products, both must be only partly miscible with the solvent, so as to form two liquid phases throughout the contacting column, unless a synthetic reflux is used.

If the component to be extracted is completely miscible with the solvent, it will not be possible to maintain two liquid phases in the extract portion of the column by returning a portion of the extract product as reflux. A synthetic reflux is used in such case of complete miscibility and the refluxing material can be any material having a boiling point different from those of the components of the mixture treated and that of the solvent and which is only partly miscible with the solvent. Suitable hydrocarbons for use as synthetic reflux include n-pentane, isopentane, n-hexane, isohexanes, isooctane, high boiling naphthenes such as dimethyl cyclohexane, ethyl cyclohexane, etc.

The synthetic reflux provides a second liquid phase in the extract portion of the contacting column and displaces the raffinate impurity from the solvent. A synthetic reflux can also be used to obtain two liquid phases in the raffinate portion of the column, as well as in the extract portion, if both components of the feed are completely miscible with the solvent at the operating temperature of the column.

Similarly, if more than two components are present in the feed, the desired extract and raffinate products must each be capable of forming separate liquid phases in the column in the presence of the solvent, and a synthetic reflux may be employed if necessary to cause the formation of separate phases, just as in the case of a two-component feed.

Each of the following objects will be attained by at least one of the aspects of this invention.

It is an object of this invention to provide a method for the separation of naphthenic hydrocarbons from mixtures containing naphthenic hydrocarbons and paraffinic hydrocarbons. It is another object of this invention to provide a new selective solvent for solvent extraction and extractive distillation processes for separating mixtures of naphthene and paraffin hydrocarbons into their component parts. It is still another object of this invention to use 2-pyrrolidone as a selective solvent. Other objects and advantages of this invention will be apparent to one skilled in the art upon studying the disclosure and the accompanying drawing which forms a part of this disclosure.

The term paraffin as employed in the specification and claims refers to the acyclic paraffins and the term naphthene refers to the alicyclic paraffins. These terms are commonly employed in the petroleum and chemical arts to distinguish non-cyclic paraffins from cyclic paraffins.

I have discovered that 2-pyrrolidone is an excellent solvent for the separation of naphthenic hydrocarbons from paraffinic hydrocarbons. This solvent is selective for naphthenic hydrocarbons including cyclohexane, cyclopentane, short chain alkyl substituted naphthenes such as methyl cyclopentane, methyl cyclohexane, and the like.

In accordance with this invention, the compound 2-pyrrolidone is employed as a selective solvent for the separation of naphthenic hydrocarbons from close-boiling paraffinic hydrocarbons. In a preferred embodiment, continuous countercurrent liquid-liquid extraction of the hydrocarbon feed is carried out using 2-pyrrolidone as the selective solvent. The invention can also be practiced as an extractive distillation process.

Figure 2:
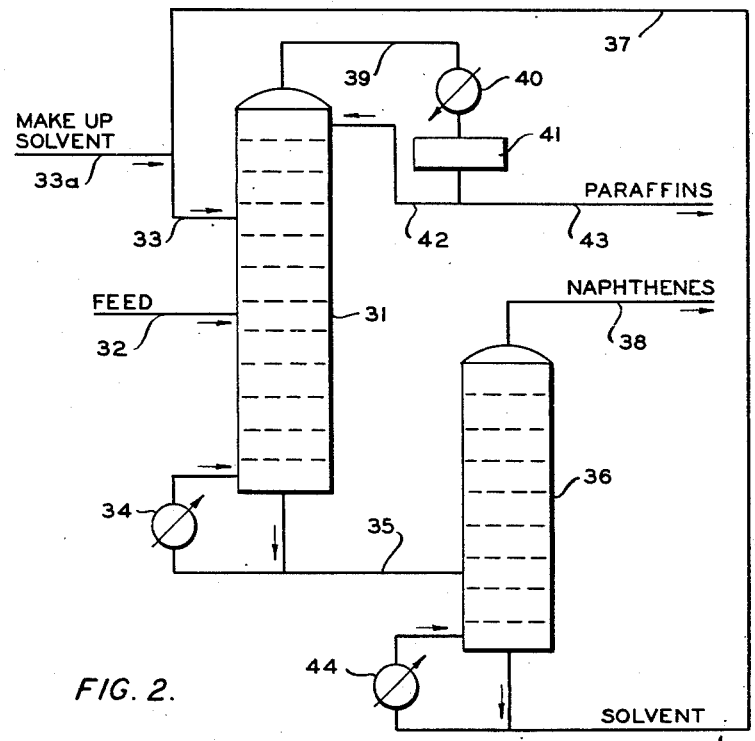

In the accompanying drawing which is a part of this disclosure, Figure 1 illustrates a preferred method for carrying out separation of these compounds by liquid-liquid extraction and Figure 2 illustrates a preferred method for carrying out a separation of these compounds by extractive distillation.

Referring now to Figure 1 a hydrocarbon feed, which for illustrative purposes will be considered to be a mixture of naphthenic and paraffinic hydrocarbons, is fed through line 11 to contact column 12. Contact column 12 can be a column containing liquid-liquid contacting trays or it can be a packed column, the packing of which can be ceramic pieces such as a Raschig rings or Berl saddles or it can be any suitable liquid-liquid contacting device. The 2-pyrrolidone solvent is added to the top of contact column 12 and recycled solvent is added to line 13 and fresh or make-up solvent is added to line 14. The extract phase containing the solvent and the preferentially dissolved naphthene hydrocarbons is removed from the bottom of column 12 and passed to separation zone 15. Separation zone 15 can be a distillation process, secondary extractor, crystallization, or any other suitable means for separating the 2-pyrrolidone from the naphthenes. A predetermined portion of this extract phase is returned to a point near the bottom of column 12 through line 16 as reflux. The 2-pyrrolidone solvent freed of naphthenes is returned through line 13 to the top of column 12. The raffinate phase comprising substantially paraffin hydrocarbons and a small portion of naphthenes along with traces of solvent carried over by entrainment or solution is removed from the top of column 12 through line 17 to separation zone 18 where the traces of solvent are removed and passed through line 19 to solvent recycle line 13. Naphthene hydrocarbons freed from the solvent are removed from separation zone 15 through line 21 and the paraffinic hydrocarbons freed of traces of solvent are removed from separation zone 18 through line 22.

In Figure 2 is shown a preferred method for the separation of naphthenic hydrocarbons from a mixture containing naphthenic and paraffinic hydrocarbons employing 2-pyrrolidone as a selective solvent in an extractive distillation process. The hydrocarbon feed is admitted to distillation column 31 at an intermediate point through line 32. Distillation column 31 can be either a bubble tray column or a packed column. The 2-pyrrolidone solvent is introduced to column 31 a few trays or the equivalent of a few trays from the top through line 33. Recovered solvent is recycled through line 37 and make-up solvent can be added through line 33a. Heat is supplied to the bottom of the column by reboiler 34 and kettle product containing the solvent and dissolved naphthenes is removed through line 35. The solvent is separated from the naphthenes in zone 36 which can be distillation, stripping, fractional crystallization, or other known methods. Heat for distillation or stripping is supplied by reboiler 44. The solvent is returned to column 31 through recycle line 37 and the naphthenes are recovered as products of the process through line 38. Hydrocarbon vapors comprising paraffins and naphthenes are removed from the top of column 31 through line 39, condensed in condenser 40 and collected as liquid in accumulator 41. A portion of this liquid is returned to the top of column 31 through line 42 as reflux to the column and the remainder of the liquid is passed from the system through line 43.

It is to be understood that Figures 1 and 2 of the drawing are schematic in nature and that incidental equipment such as valves, pumps and other elements not necessary to the understanding of this invention have been omitted from the drawings.

*Example*

A feed stream comprising substantially equimolar quantities of cyclohexane and 2,4-dimethylpentane is supplied to a continuous countercurrent liquid-liquid extraction column at a rate of 1,500 gallons per hour. The column is operated at a temperature of 275° F. The solvent, 2-pyrrolidone, is introduced at the top of the column at the rate 5,060 gallons per hour. A raffinate product comprising 95 mole percent 2,4-dimethylpentane and an extract product comprising 99 mole percent cyclohexane (solvent-free basis) are produced. A portion of the extract product cyclohexane is reintroduced at a point near the bottom of the column as reflux, at a reflux ratio of 10.03:1 based on the extract product.

The operating conditions for liquid-liquid solvent extraction will vary with the components being separated. However, in general, reflux ratios, based on the extract product, between 7 and 15 can be employed, more preferably reflux ratios will be between 9 and 11. The number of theoretical stages will usually vary between 15 and 30, however, the number of theoretical stages required in any particular instance will depend upon the materials being separated, the purity of product desired, and other operating conditions. The volume ratio of solvent to feed can be in the range of 2:1 to 8:1, however, the ratio of solvent to feed will depend upon variables such as those mentioned in connection with the number of theoretical stages required. The temperature can be in the range of 100° to 350° F. The preferred temperature range for the separation of cyclohexane from 2,4-dimethylpentane is between 250° and 285° F.

The operating conditions for extractive distillation will be determined by the volatility of the lighter component of the mixture to be separated when in admixture with the solvent. The effect of the solvent is to vary the volatility of one component more than it does the other.

The solvent of my invention offers many advantages not obtained by solvents of the prior art. Included in these advantages are: good solubility for naphthenes, so that low ratios of solvent to feed are possible; good selectivity for naphthenes in the presence of paraffins, which reduces the number of theoretical stages required, and high extractor operating temperature. As an example of the last named advantage, less heat is required for separating the product from the extract phase and less cooling is required in the solvent recycle stream when the extractor column is operated at a high temperature. The boiling point of 2-pyrrolidone is high, being 473° F., so that in many cases the products can be separated from the solvent by a simple flashing step.

The solvent of my invention can be used to separate any members of the paraffin series of hydrocarbons having different miscibility characteristics. Thus in addition to the separation of cycloparaffins from acyclic paraffins, straight chain paraffins can be separated from branched chain paraffins and paraffins having different molecular weights can be separated from each other using 2-pyrrolidone as the selective solvent.

It is within the scope of this invention to modify the 2-pyrrolidone solvent by the addition of another solvent or modifying agent to the solvent. Such modifying agents and solvents which may be used with 2-pyrrolidone include water, alcohols, glycols, ethers, furfural and phenol.

Variations and modifications are possible within the scope of the disclosure of this invention, the essence of which is that 2-pyrrolidone has been found to be an excellent selective solvent for the preferential separation of naphthene hydrocarbons from mixtures containing naphthenes and paraffin hydrocarbons.

I claim:

1. A process for the separation and recovery of a naphthene hydrocarbon from an aromatic-free mixture of naphthene hydrocarbons and paraffin hydrocarbons having similar boiling points, which comprises contacting said mixture with liquid 2-pyrrolidone at a temperature in the range 100 to 350° F.; recovering a solvent phase; and recovering a naphthene hydrocarbon from said solvent phase.

2. The process of claim 1 wherein said separation is carried out as a solvent extraction process.

3. The process of claim 1 wherein said separation is carried out as an extractive distillation process.

4. A process for the separation and recovery of cyclohexane from an aromatic-free mixture of cyclohexane and 2,4-dimethylpentane which comprises contacting said mixture with 2-pyrrolidone at a temperature in the range 250° to 285° F.; recovering an extract product comprising cyclohexane and 2-pyrrolidone; and recovering cyclohexane from said extract.

5. A process for the separation and recovery of a naphthene hydrocarbon from an aromatic-free mixture containing at least one paraffin hydrocarbon, said hydrocarbons having similar boiling points, which comprises contacting said admixture with liquid 2-pyrrolidone at a temperature in the range 100 to 350° F.; recovering a liquid solvent phase; recovering said paraffin as a vapor; and recovering a naphthene hydrocarbon from said solvent phase.

6. The process of claim 5 wherein the naphthene is cyclohexane.

7. The process of claim 5 wherein the naphthene is cyclopentane.

8. The process of claim 5 wherein the naphthene is methylcyclohexane.

9. The process of claim 5 wherein the naphthene is methylcyclopentane.

10. A continuous, countercurrent, liquid-liquid extraction process for the separation of alicyclic paraffin hydrocarbons from an aromatic-free mixture of alicyclic hydrocarbons and acyclic paraffin hydrocarbons which comprises passing a feed stream of said mixture of hydrocarbons into a contact zone; passing liquid 2-pyrrolidone into the upper portion of said zone; maintaining two liquid phases in said zone at a temperature in the range 100 to 350° F.; removing a raffinate phase comprising acyclic paraffin hydrocarbons from said zone; removing an extract phase comprising alicyclic paraffin hydrocarbons and liquid 2-pyrrolidone from said zone; separating said alicyclic paraffin hydrocarbon from said 2-pyrrolidone; and returning a portion of said alicyclic paraffin hydrocarbon to said zone as reflux.

11. In the process of claim 10 wherein the alicyclic paraffin hydrocarbon is completely miscible with said liquid 2-pyrrolidone, the step of using as reflux a hydrocarbon liquid immiscible with said liquid 2-pyrrolidone.

12. The process of claim 11 wherein said hydrocarbon liquid is normal pentane.

References Cited in the file of this patent

UNITED STATES PATENTS

| | | |
|---|---|---|
| 2,396,299 | Sweeney et al. | Mar. 12, 1946 |
| 2,396,302 | Cummings | Mar. 12, 1946 |
| 2,433,751 | Friedman | Dec. 30, 1947 |
| 2,508,723 | Mayland | May 23, 1950 |
| 2,552,198 | Mayland | May 8, 1951 |
| 2,599,649 | Lorenz | June 10, 1952 |
| 2,667,446 | Findlay | Jan. 26, 1954 |